United States Patent [19]

Buchanan et al.

[11] Patent Number: 4,842,107
[45] Date of Patent: Jun. 27, 1989

[54] FLUID SYSTEM BLEEDING APPARATUS

[75] Inventors: Nigel Buchanan, New Gilston, by Leven, Fife, United Kingdom, KY8 5TF; John Brodie, Fife, United Kingdom

[73] Assignee: Nigel Buchanan, United Kingdom

[21] Appl. No.: 123,857

[22] PCT Filed: Jan. 28, 1987

[86] PCT No.: PCT/GB87/00054
§ 371 Date: Nov. 24, 1987
§ 102(e) Date: Nov. 24, 1987

[87] PCT Pub. No.: WO87/04675
PCT Pub. Date: Aug. 13, 1987

[30] Foreign Application Priority Data

Jan. 31, 1986 [GB] United Kingdom ................ 8602486

[51] Int. Cl.⁴ ..................... B60T 11/00; F16D 65/00
[52] U.S. Cl. ..................... 188/352; 60/378; 60/584; 137/209; 285/8; 285/346
[58] Field of Search ........... 188/352; 60/378, 584; 285/8, 346; 137/209

[56] References Cited

U.S. PATENT DOCUMENTS

| 509,353 | 11/1893 | Austin | 285/8 X |
|---|---|---|---|
| 1,372,928 | 3/1921 | Barton | 137/209 |
| 2,295,539 | 9/1942 | Beach | 60/584 X |
| 2,721,089 | 10/1955 | Shames | 285/8 |
| 2,872,951 | 2/1959 | Wilkerson | 188/352 X |
| 3,074,746 | 1/1963 | Shasmes et al. | 285/8 |
| 3,149,762 | 9/1964 | Decker | 222/478 |
| 3,339,401 | 9/1967 | Peters | 73/40.5 |

FOREIGN PATENT DOCUMENTS

| 11155 | 10/1979 | European Pat. Off. |
| 2910086 | 9/1980 | Fed. Rep. of Germany . |
| 995099 | 8/1951 | France ................... 188/352 |
| 1013745 | 5/1952 | France . |

Primary Examiner—George E. A. Halvosa
Attorney, Agent, or Firm—Lalos & Keegan

[57] ABSTRACT

Apparatus for use in the bleeding of fluid systems, especially the hydraulic brake system of a motor vehicle, comprises fluid pumping equipment (1) for pumping fluid to a main fluid reservoir (8) of the fluid system via a supply conduit (24). The pumping equipment (1) includes a fluid container (6) and an air pump (2) serving to discharge fluid from the container (6) into the supply conduit (24). The pump (2) is driven through an electric circuit (C1.C2) including a fluid pressure control (14) and a fluid level control (15A) of the container (6). The delivery end of the supply conduit (24) passes through an opening (26) of the reservoir (8) which opening (26) is sealed by an elastomeric plug (18) laterally expandable by a compression device. The above apparatus considerably conveniences the bleeding of motor vehicle brake systems.

9 Claims, 1 Drawing Sheet

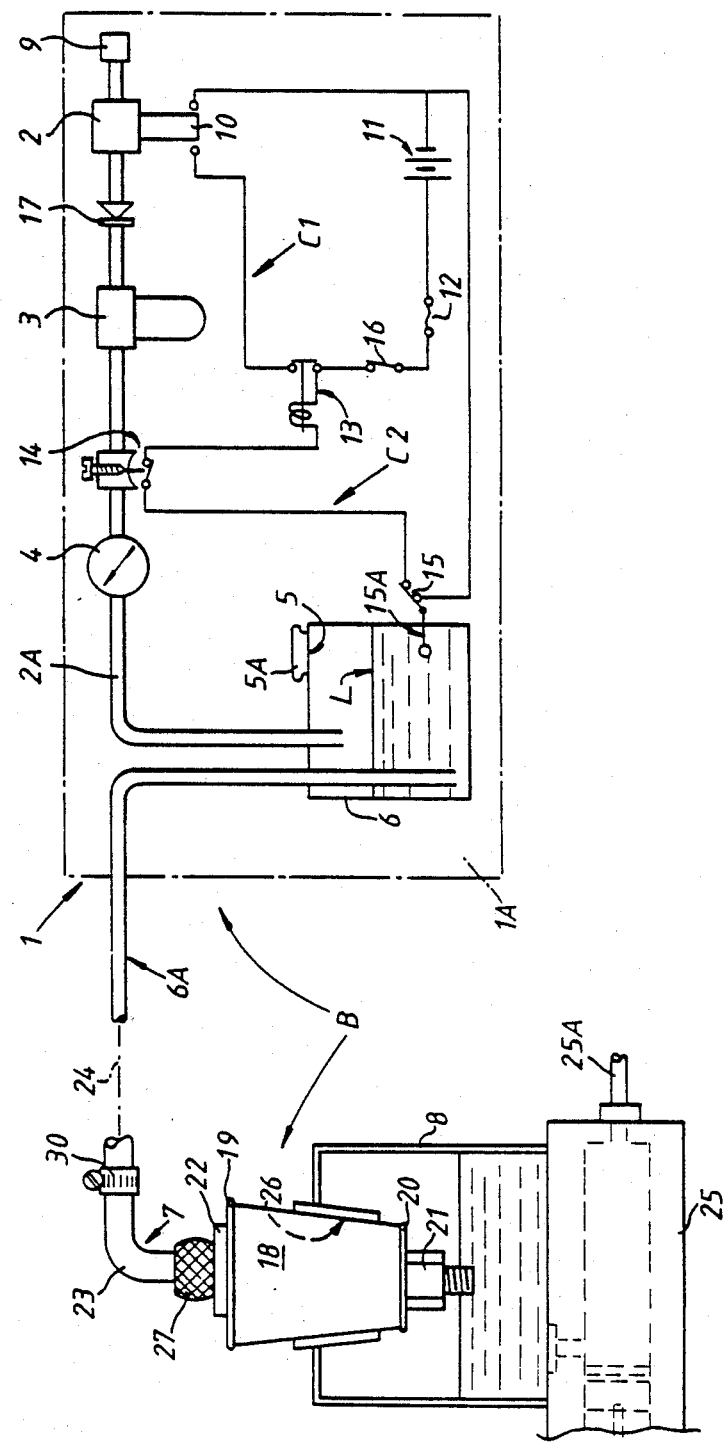

FLUID SYSTEM BLEEDING APPARATUS

The present invention relates to apparatus for use in the bleeding of fluid systems, and especially but not exclusively for use in the bleeding of hydraulic brakes in motor vehicles.

In the hydraulic brake system of a motor vehicle, it is possible for air pockets to develop in the fluid line from the master cylinder or reservoir to the fluid operable brake actuators at the brake shoes or pads, and this can adversely affect brake operation to a severe and even dangerous degree. Also, the quality of fluid in a fluid system can deteriorate through time so necessatating replacement of the fluid. In these situations it is necessary to bleed the fluid from the system and then pass replacement or filling fluid to the system, and in motor vehicles bleed valves are located at the brake actuators to enable bleeding of the fluid brake system. Up until now, fluid brake bleeding has been achieved by fitting a discharge pipe between the bleed valve and a collector vessel containing brake fluid, and with the bleed valve open, pumping the brake pedal to discharge fluid from the fluid line. The method is completed by closing the bleed valve and topping the system with brake fluid. However this method has not proved entirely satisfactory and it is possible for air pockets to remain in the system even after applications of the method.

It is the principal subject of the present invention to provide a fluid system bleeding apparatus enabling fluid bleeding in systems, especially of vehicle brakes, in a more efficient and convenient manner.

According to the present invention there is provided apparatus for use in the bleeding of fluid systems, especially the hydraulic brake system of a motor vehicle, which systems include a master reservoir for fluid, said apparatus comprising a fluid pumping assemblage including a primary reservoir to supply fluid to the master reservoir of a fluid system to be bled, a pump for pumping air to said primary reservoir for the displacement of fluid from the fluid reservoir, a feed conduit connecting said pump and the primary reservoir, an electric motor connectible to an electric power supply source and serving to drive said pump, and control circuit means for the electric motor, said control circuit means including an air pressure control device controlling the operation of the electric motor dependent on the air pressure supply to said primary reservoir to maintain the pressure of the displaced fluid below a predetermined limit, said fluid pumping assemblage additionally including a support member carrying said pump, the supply conduit, the electric motor and the control circuit means all in an assembled condition; a supply conduit for the delivery of fluid displaced from the primary reservoir to the master reservoir of a fluid system via a fluid supply opening in said master reservoir; and a sealing unit removably fitted at an outer end portion of said supply conduit by releasable securing means, said sealing unit including resilient sealing means enabling the sealing unit to be sealingly fitted into a fluid supply opening in a master reservoir.

An embodiment of the present invention will now be described by way of example with reference to the accompanying drawing which shows schematically a fluid bleeding apparatus serving especially for the bleeding of motor vehicle brakes and in accordance with the present invention.

Thus a fluid bleeding apparatus B includes a fluid pumping unit 1 comprising a base plate 1A carrying an air pump 2 and a primary fluid reservoir 6 receiving pressurised air from the pump 2 via a conduit 2A. Intercalated in the conduit 2A are an air filter and moisture trap 3, an air pressure gauge 4, an air pressure control switch device 14 and a one way valve 17, while the inlet to the pump 2 is provided with an air filter 9. The pump 2 includes an electric drive motor 10 supplied with electric power via a circuit C1, which has a power source in the form of batteries 11: as an alternative to the batteries 11 the circuit C1 could be plugged into an external power source such as the vehicle battery. Circuit C2 is arranged in parallel with C1 and has a controlling role over C1 with respect to the fluid level in reservoir 6 and to the air pressure in conduit 2A. The circuit C2 is connected to C1 via a solenoid relay switch 13, and as can be seen circuit C2 include a switch 15 operable by a level sensing float 15A in the reservoir 6 while additionally the pressure control switch service 14 is connected into the circuit C2. Circuit C1 includes a master switch 16 and an appropriate fuse 12.

A discharge conduit 6A extends close to the bottom of reservoir 6 and hence below the level of the brake fluid (liquid) in the reservoir 6 and serves for the delivery of brake fluid from reservoir 6 to the reservoir 8 of a brake master cylinder 25 which carries pipeline 25A supplying to a brake fluid actuator (not shown). The initial section of conduit 6A comprises a flexible tube 24 while the outer end of the conduit 6A is in the form of a sealing adaptor device 7 fitted to the tube 24 by a clip (jubilee) 30 and serving to sealingly secure the discharge end of conduit 6A to a fluid supply opening 26 in the master reservoir 8; the adaptor device 7 comprising a threaded tube bend 23 carrying a sealing element of elastomeric material (e.g. rubber) in the form of a tapered bung 18 sandwiched between end flange plates 19, 20, and a compression device for deforming or expanding the bung 18 for sealingly fitting the adaptor 7 in the opening 26.

The compression device comprises a nut 21 threaded on the bend 27 and secured to the plate 20 which has an abrasive surface for frictional engagement with the bung 18 so that the nut 21 is relatively fixed, and a collar 22 fixed to the threaded bend 23 and abutting the flange plate 19, the bend 23 including a large diameter neck portion 27. The adaptor device 7 is sealingly fitted into the opening 26 by screwing the pipe bend 23 into the nut 21 by turning in a clockwise direction (the bend 23 may be initially freed from the flexible tube 24), the elbow of the bend enabling the application of a suitable turning movement, so that the collar 22 moves towards the fixed nut 21 to expand the bung 18 laterally and to create the securing and sealing effect in the opening 26. The primary reservoir 6 includes a fluid supply inlet 5 provided with a closure cap 5A fitted with a filler-/safety pressure release valve, and the various parts of the pump unit 1 can be covered by a casing.

In operation of the apparatus to bleed an hydraulic brake in a motor vehicle, the bleed valve of the brakes fluid actuator is firstly connected to a fluid receiver by a short pipe section and then placed in the "open" condition. The adaptor 7 is sealing secured in the opening 26 of the master reservoir 8 with the outer end of the pipe bend 27 below the liquid level in the reservoir 8. With an appropriate liquid level in reservoir 6 the level switch 15 will be closed as will pressure switch 14 in circuit C2, and the pumping unit 1 is started by closing master switch 16 causing energisation and closure of the solenoid switch 13 and thereby electric power supply to the pump motor 10. The operating pump 2 draws air through filter 9 and pumps the air through conduit 2A via the moisture trap 3 to the primary reservoir 6. The pump 2 continues to operate until the predetermined air pressure is attained at which stage pressure switch 14 opens to stop pump 2 through de-energisation of the solenoid switch 13. The pressure switch device 14 will control starting and stopping of the pump 2 to maintain the air pressure at the desired level. The apparatus is preferably set so that the switch 14 opens when a pressure of approximately 15 P.S.i. is present and preferably no more than about 20 P.S.i.; switch 14 should be closed when the pressure has fallen to say about 11 P.S.i. The float switch 15 will open if the liquid level L in reservoir 6 falls below the required level to stop pump 2 and closes automatically when the liquid level is increased. The one way valve 17 prevents air leaking back through the pump 2. The arrangement of unit 1 is such that the air pressure is kept virtually constant, and the pressurised air acting on the free surface of the liquid in the reservoir 6 causes the liquid to be delivered to the master reservoir 8 via conduit 6A resulting in fluid pressure build-up in the master cylinder 25 to discharge the liquid present in the line 25A via the bleed valve and to cause subsequent refilling of the line 25A with brake liquid. At an appropriate time, the pump unit 1 can be stopped, the bleed valve closed, and the vehicle brake system placed in readiness for further use with the bleed apparatus B removed.

In comparison with the prior brake bleeding method, brake bleeding utilising the apparatus of the present invention does not require brake pedal pumping and consequently a more precise, accurate and convenient bleeding operation is possible. Whereas the above apparatus B was described in relation to the bleeding of a vehicle brake system, it will be appreciated that the apparatus can be readily used in the bleeding of other fluid systems. Modifications are of course possible: both the pump unit 1 and the adaptor device 7 could be of different form. For example the part 27 of the adaptor could comprise a nut threaded to the bend 23 so as to be axially movable towards the nut 21 thereby expanding the bung, and this would remove the need for the adaptor 7 to be freed from the tube 24 for lateral expansion of the bung 18.

We claim:

1. Apparatus for use in the bleeding of fluid system, especially the hydraulic brake system of a motor vehicle, which systems include a master reservoir for fluid, said apparatus comprising a fluid pumping assemblage including a primary reservoir to supply fluid to the master reservoir of a fluid system to be bled, a pump for pumping air to said primary reservoir for the displacement of fluid from the primary reservoir, a feed conduit connecting said pump and the primary reservoir, an electric motor connectible to an electric power supply source and serving to drive said pump, and control circuit means for the electric motor, said control circuit means including an air pressure control device for controlling the operation of the electric motor dependent on the air pressure supply to said primary reservoir to maintain the pressure of the displaced fluid below a predetermined limit, said fluid pumping assemblage additionally including a support member for carrying said pump, the feed conduit, the electric motor and the control circuit means all in an assembled condition; a supply conduit for the delivery of fluid displaced from the primary reservoir to the master reservoir of a fluid system via a fluid supply opening in said master reservoir; and a sealing unit removably fitted at an outer end portion of said supply conduit by releasable securing means, said sealing unit including resilient sealing means enabling the sealing unit to be sealingly fitted into a fluid supply opening in a master reservoir.

2. Apparatus according to claim 1 wherein the control circuit means includes a fluid level sensing means operable to stop the electric motor when the fluid level in the primary reservoir falls to a predetermined level.

3. Apparatus according to claim 2, wherein the control circuit means includes a first electric circuit for the connection of the electric motor to an electric power source, and a second electric circuit connected into said first circuit by switch means, said second electric circuit including said air pressure control device and said fluid level, sensing means.

4. Apparatus according to claim 1 wherein the sealing means comprises an elastomeric element and compression means actuable to expand or deform the elastomeric element, whereby the element engages an inner peripheral wall of said fluid supply opening to seal the opening.

5. Apparatus according to claim 4, wherein the elastomeric element comprises a tapering plug.

6. Apparatus according to claim 4 wherein said sealing unit has a conduit portion including a metal tube connected to the supply conduit by fastener means, said elastomeric element being carried by said conduit portion.

7. Apparatus according to claim 1, wherein an air cleaning device is intercalated in the feed conduit delivering pressurized air from the pump to the primary reservoir.

8. Apparatus according to claim 1, wherein the support member carries a battery supplying power to the electric motor.

9. Apparatus according to claim 1, wherein the fluid pumping assemblage is connectible to an electric power source separate from the assemblage.

* * * * *